(12) United States Patent
Yun

(10) Patent No.: US 7,577,067 B2
(45) Date of Patent: Aug. 18, 2009

(54) METHOD FOR PERFORMING OPTIMAL RECORDING POWER CALIBRATION IN RECORDER AND RECORDING MEDIUM THEREFOR

(75) Inventor: Yeo Han Yun, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 10/980,263

(22) Filed: Nov. 4, 2004

(65) Prior Publication Data
US 2005/0117480 A1    Jun. 2, 2005

(30) Foreign Application Priority Data
Nov. 4, 2003    (KR) .................. 10-2003-0077769

(51) Int. Cl.
*G11B 7/0045*    (2006.01)
(52) U.S. Cl. ................ 369/47.53; 369/47.5; 369/53.26
(58) Field of Classification Search ............. 369/47.53, 369/47.55, 53.37, 47.5, 47.51, 53.26
See application file for complete search history.

(56) References Cited

U.S. PATENT DOCUMENTS

| | | | | |
|---|---|---|---|---|
| 5,872,763 A * | 2/1999 | Osakabe | ................ | 369/47.53 |
| 5,898,656 A * | 4/1999 | Takiguchi | ................ | 369/47.51 |
| 6,288,992 B1 * | 9/2001 | Okumura et al. | ........... | 369/47.5 |
| 6,418,102 B1 * | 7/2002 | Suga | ................ | 369/47.53 |
| 6,967,915 B2 * | 11/2005 | Lin | ................ | 369/47.53 |
| 7,106,673 B2 * | 9/2006 | Takeda | ................ | 369/47.53 |
| 2001/0007546 A1 * | 7/2001 | Lee et al. | ................ | 369/47.53 |
| 2002/0034137 A1 * | 3/2002 | Okumura et al. | ........... | 369/47.5 |
| 2002/0067670 A1 * | 6/2002 | Akiyama et al. | ......... | 369/47.52 |
| 2002/0101806 A1 * | 8/2002 | Miyaki | ................ | 369/47.53 |
| 2002/0131341 A1 * | 9/2002 | Kadlec et al. | ............ | 369/44.29 |
| 2003/0007435 A1 | 1/2003 | Fukumoto | | |
| 2003/0151994 A1 * | 8/2003 | Tasaka et al. | ............ | 369/47.53 |
| 2004/0156280 A1 * | 8/2004 | Steenbergen | ............... | 369/47.3 |
| 2004/0156286 A1 * | 8/2004 | Miyaki | ................ | 369/47.53 |
| 2004/0246836 A1 * | 12/2004 | Choi | ................ | 369/47.5 |

FOREIGN PATENT DOCUMENTS

CN    1393858 A    1/2003

* cited by examiner

*Primary Examiner*—Wayne R Young
*Assistant Examiner*—Thomas D Alunkal
(74) *Attorney, Agent, or Firm*—Birch, Stewart, Kolasch & Birch, LLP

(57) ABSTRACT

A recording medium and method for controlling a recording operation using at least two OPC information obtained from performing at least two OPC operations for the same drive. The method includes comparing the two PC information with each other, and controlling a recording operation of the recording medium based on the comparison result.

4 Claims, 10 Drawing Sheets

FIG. 2
(Related Art)

*Format of RMD 1*

|  | Format of RMD 1 |
|---|---|
| Field 0 | Common information |
| Field 1 | OPC related information |
| Field 2 | User specification data |
| Field 3 ⋮ Field 12 | Border Zone information |
| | RZone information |
| Field 13 | Set to (00) |
| Field 14 | Set to (00) |

FIG. 3
(Related Art)

*Format of Field 1*

| BP | | Contents | Number of bytes |
|---|---|---|---|
| 0 to 31 | No 1 | Drive manufacturer ID | 32 |
| 32 to 47 | | Serial number | 16 |
| 48 to 63 | | Model number | 16 |
| 64 to 67 | | 1st field of Write Strategy code | 4 |
| 68 to 71 | | Recording power | 4 |
| 72 to 79 | | Time stamp | 8 |
| 80 to 83 | | Power calibration address | 4 |
| 84 to 107 | | Running OPC information | 24 |
| 108 to 113 | | 2nd field of Write Strategy code | 6 |
| 114 and 115 | | Set to (00) | 2 |
| 116 and 117 | | Recording power by 8-bit coded power | 2 |
| 118 to 127 | | Set to (00) | 10 |
| 128 to 159 | No 2 | Drive manufacturer ID | 32 |
| 160 to 175 | | Serial number | 16 |
| ----- | | | |
| 256 to 287 | No 3 | Drive manufacturer ID | 32 |
| 288 to 303 | | Serial number | 16 |
| ----- | | | |
| 384 to 415 | No 4 | Drive manufacturer ID | 32 |
| 416 to 431 | | Serial number | 16 |
| ----- | | | |

Format of Field 1

| BP | | Contents | Number of bytes |
|---|---|---|---|
| 0 to 31 | No 1 | *Drive manufacturer ID (ex : LGE_drive)* | 32 |
| - - - - - | | - - - - - | - - - - - |
| 68 to 71 | | *Recording power (1)* | 4 |
| 72 to 79 | | Time stamp | 8 |
| - - - - - | | - - - - - | - - - - - |
| 114 and 115 | | Set to (00) | 2 |
| - - - - - | | - - - - - | - - - - - |
| 128 to 159 | No 2 | *Drive manufacturer ID (ex : LGE_drive)* | 32 |
| - - - - - | | - - - - - | - - - - - |
| 196 to 199 | | *Recording power (2)* | 4 |
| 200 to 207 | | Time stamp | 8 |
| - - - - - | | - - - - - | - - - - - |
| 242 and 243 | | Set to (00) | 2 |
| - - - - - | | - - - - - | - - - - - |
| 256 to 287 | No 3 | Drive manufacturer ID | 32 |
| - - - - - | | - - - - - | - - - - - |
| 324 to 327 | | Recording po~ | |

FIG. 8

Format of Field 1

| BP | | Contents | Number of bytes |
|---|---|---|---|
| 0 to 31 | No 1 | *Drive manufacturer ID (ex : LGE_drive)* | 32 |
| - - - - - | | - - - - - | - - - - - |
| 68 to 71 | | *Recording power (1)* | 4 |
| 72 to 79 | | Time stamp | 8 |
| - - - - - | | - - - - - | - - - - - |
| 114 and 115 | | Beta Ratio (1) | 2 |
| - - - - - | | - - - - - | - - - - - |
| 128 to 159 | No 2 | *Drive manufacturer ID (ex : LGE_drive)* | 32 |
| - - - - - | | - - - - - | - - - - - |
| 196 to 199 | | *Recording power (2)* | 4 |
| 200 to 207 | | Time stamp | 8 |
| - - - - - | | - - - - - | - - - - - |
| 242 and 243 | | Beta Ratio (2) | 2 |
| - - - - - | | - - - - - | - - - - - |
| 256 to 287 | No 3 | Drive manufacturer ID | 32 |
| - - - - - | | - - - - - | - - - - - |
| 324 to 327 | | Recording po... | |

US 7,577,067 B2

METHOD FOR PERFORMING OPTIMAL RECORDING POWER CALIBRATION IN RECORDER AND RECORDING MEDIUM THEREFOR

This application claims the benefit of Korean Patent Application No. 2003-077769 filed on Nov. 4, 2003, the entire contents of which are herein fully incorporated by reference.

BACKGROUND OF THE INVENTION

1. Field of the Invention

The present invention relates to a method for performing an optimal recording power calibration (OPC) and a recording medium therefor, which can enable an OPC operation to be efficiently performed in a recorder for recording data on the recording medium such as a digital versatile disc-rewritable (DVD-RW).

2. Description of the Related Art

Recently, high-density recording mediums capable of permanently recording high-quality video and audio data, for example, digital versatile discs-rewritable (DVDs-RW), have been developed, commercialized and supplied. Furthermore, recorders such as DVD-recorders for recording and reproducing data on and from the DVDs-RW have been developed, commercialized and supplied.

As shown in FIG. 1, a power calibration area (PCA) necessary for performing an optimal recording power calibration (OPC) operation and a recording management area (RMA) are assigned to a DVD-RW. The PCA and the RMA are positioned at an inner area of the disc before a lead-in zone of the disc.

When a recorder such as a DVD-recorder receives a recording command based upon a user request, an OPC operation for recording data on an optical disc normally is automatically performed. The OPC operation includes a recording operation of predetermined test data in the PCA and an adjustment operation of a recording power value so that a beta ratio value indicating an asymmetry ratio of a radio frequency (RF) signal read and detected according to the recorded test data is close to zero. In this case, one error correction code (ECC) block having a size of 16 sectors within the PCA is used from an outer circumference direction to an inner circumference direction of the disc.

Further, the RMA can contain, among other things, 28 recording management data (RMD) blocks $40a$, $40b$ . . . , in which recording related data associated with an OPC operation are stored. Each RMD $40a$, $40b$, . . . defined in the DVD-RW standard contains 15 fields (Field 0~Field 14) each of which has a size of one sector as shown in FIG. 2 depicting the fields of RMD 1 ($40a$).

Furthermore, the second field (Field 1) for the RMD 1 ($40a$) contains OPC related information. As shown in FIG. 3 depicting the Field 1 of the RMD 1, a time stamp in which $73^{rd}$ to $80^{th}$ bytes 48 (Byte Position 72 to 79) having a size of 8 bytes in the second field (Field 1) of the RMD 1 are recorded contains time information relating to the OPC operation. For example, as shown in FIG. 4, hour, minute and second information relating to the OPC operation is recorded in the $1^{st}$ to $4^{th}$ bytes of the time stamp, and year, month and day information relating to the OPC operation is recorded in the remaining $5^{th}$ to $8^{th}$ bytes of the time stamp. In FIG. 3, "No 1", "No 2", "No 3", etc., represent different drives such that the drive manufacturer IDs in these sections are different from each other.

In the related art, however, each time a user data recording command is received, the recorder such as the existing DVD-recorder performs an OPC operation. This causes a delay in the actual user data recording, because a significant time is spent performing the OPC operation each time a recording command is received. In the related art, only one recording power value per drive is recorded in the Field 1 of the RMD 1 at any given time.

In another related art, the recorder records an OPC information such as a recording power value upon execution of a first OPC operation. No new OPC is performed. Then the recorded recording power value is used repeatedly for all data recording operations on the disc. This creates a problem because the OPC information being used may not produce an optimal data recording operation if a long time has elapsed since the first OPC operation.

SUMMARY OF THE INVENTION

Therefore, the present invention has been made to overcome the above and other problems associated with the related art.

It is an object of the present invention to provide a method for performing optimal recording power calibration (OPC) in a recorder and a recording medium therefor, which can enable the OPC to be efficiently and simply performed by recording a plurality of resultant information items based upon a plurality of OPC operations in a specific area of a recording medium such as a digital versatile disc-rewritable (DVD-RW) and by allowing the recorder to retrieve and refer to the plurality of resultant information items recorded in the specific area of the recording medium.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a table illustrating information recorded in fields of RMD 1 in FIG. 1;

FIG. 3 is a table illustrating optimal power calibration (OPC) related information recorded in the second field (Field 1) of the RMD 1 in FIG. 2;

FIG. 6 is a table illustrating drive manufacturer identifications (IDs) and recording power information in OPC related information recorded in the second field (Field 1) of the RMD 1 in accordance with the present invention;

FIG. 8 is a table illustrating drive manufacturer IDs, recording power information and beta ratio information in the OPC related information recorded in the second field (Field 1) of the RMD 1 in accordance with the present invention;

DETAILED DESCRIPTION OF PREFERRED EMBODIMENTS

Hereinafter, preferred embodiments of a method for performing optimal recording power calibration (OPC) in a recorder and a recording medium therefor in accordance with the present invention will be described in detail with reference to the annexed drawings.

Figure 5:
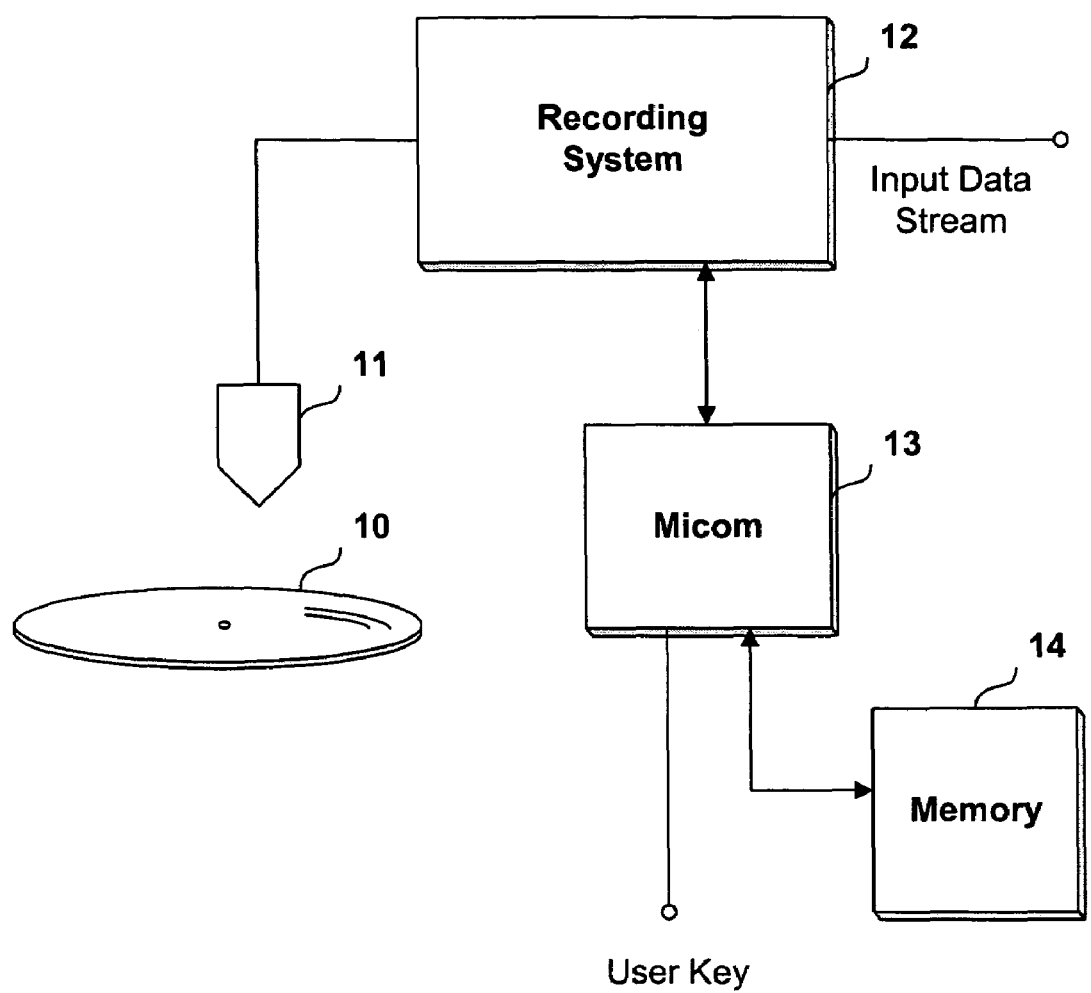
FIG. 5 is a block diagram illustrating a recorder to which an optimal recording power calibration (OPC) method is applied in accordance with the present invention.

First, the OPC method in accordance with the present invention can be applied to a recorder such as a digital versatile disc (DVD)-recorder. For example, the recorder includes an optical pickup 11, a recording system 12, a microcomputer 13, a memory 14, etc. as shown in FIG. 5. All the components of the recorder are operatively coupled. The recorder can record and reproduce data to and from the recording medium.

The recording system 12 performs an OPC operation for appropriately recording an input data stream on a recording medium 10 such as a digital versatile disc-rewritable (DVD-RW) according to the operation control of the microcomputer 13. In accordance with a first embodiment of the present invention, a plurality of resultant information items, e.g., at least two recording power values, based upon the OPC operations are recorded in a specific area of the recording medium.

FIG. 6 shows the structure of the second field (Field 1) of RMD 1 according to an embodiment of the present invention. As shown in FIG. 6, a first recording power value is recorded in the second field (Field 1) of the RMD 1 as first recording power information (Recording power (1)) at $69^{th}$ to $72^{nd}$ bytes (BP 68 to 71) having a size of 4 bytes. The first recording power value is obtained by performing an OPC operation. Subsequently, a second recording power value is recorded as second recording power information (Recording power (2)) at $197^{th}$ to $200^{th}$ bytes (BP 196 to 199) having a size of 4 bytes in the second field (Field 1) of the RMD 1. The second recording power value is obtained by performing another OPC operation. The plurality of recording power information items such as recording power values are recorded in relation to the same drive manufacturer identity (ID) (e.g., LGE_drive). That is, for each same drive such as LGE_drive, at least two recording power values each obtained after executing a new OPC operation (at different times) are stored at different locations in the Field 1 of the RMD. Thus, in the present invention, in this example, "No 1" and "No 2" in FIG. 6 may not necessarily represent different drives, but represent the same drive (LGE_drive). "No 3" can be the same drive as the drive of "No 1" and "No 2", or can be different.

Upon receiving a recording command through an interface with the microcomputer 13, the recording system 12 reads and compares the plurality of recording power values recorded in relation to the same drive manufacturer ID within a rewritable RMD block, and efficiently and simply performs a subsequent OPC and/or data recording operation according to the result of the comparison. This will be described below in detail.

Figure 7:
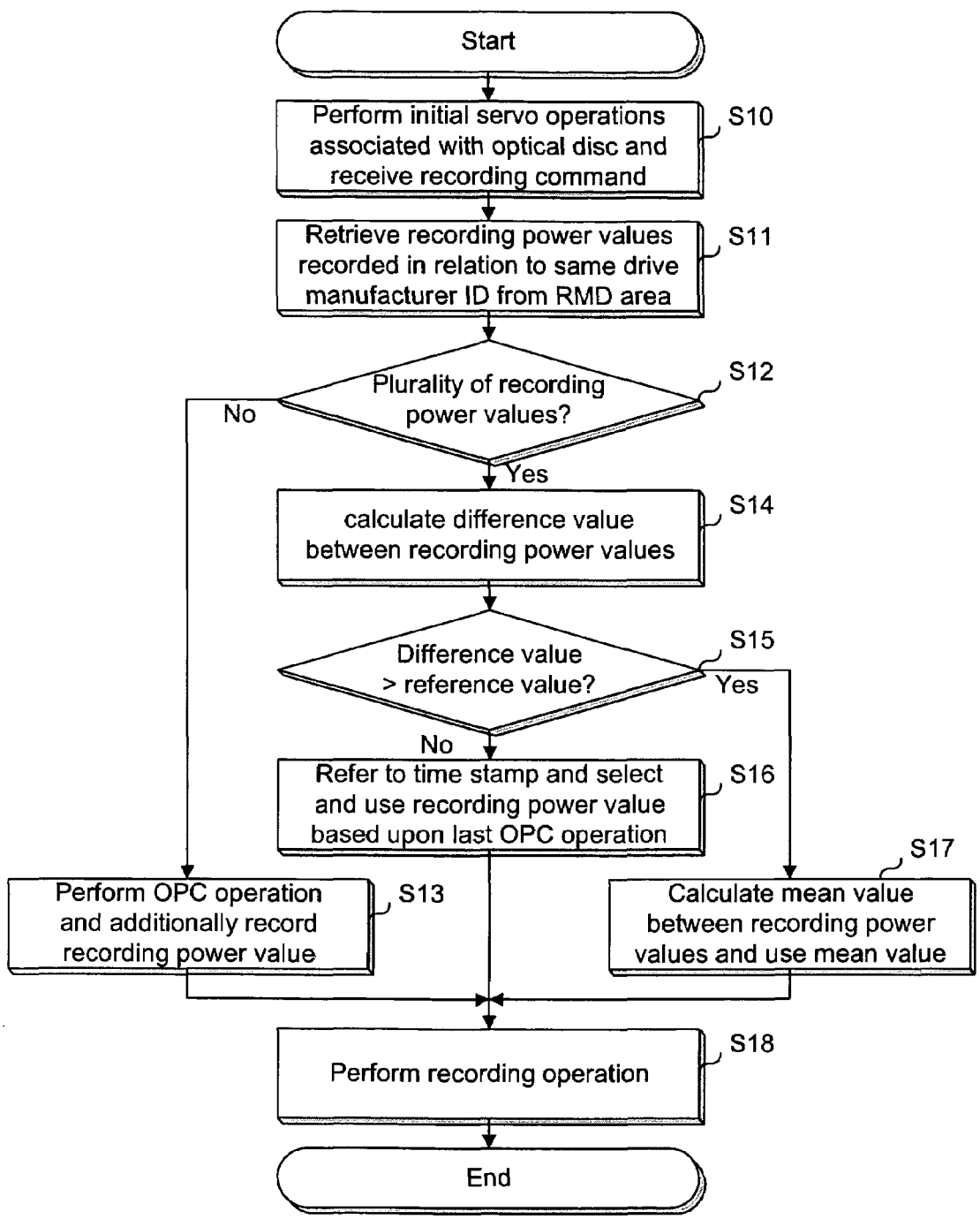
FIG. 7 is a flow chart illustrating an OPC method in the recorder in accordance with a first embodiment of the present invention.

FIG. 7 is a flow chart illustrating an OPC method in the recorder in accordance with a first embodiment of the present invention. FIG. 7 is explained assuming that the current drive is, e.g., LGE_drive, but is applicable to any drive. Where the DVD-RW 10 is inserted into the recorder such as the DVD-recorder as an example, the microcomputer 13 performs a set of initial servo operations such as conventional focus and tracking servo operations. When a recording command is received according to a user request (S10), the microcomputer 13 controls an operation of the recording system 12.

As described with reference to FIG. 6, if the current drive is, e.g., LGE_drive, then the recording system 12 retrieves the recording power values recorded in relation to the same drive manufacturer ID (LGE_drive) from a specific area of the DVD-RW 10, for example, the second field (Field 1) of the RMD 1 (S11).

If the recording power values recorded in relation to the same drive manufacturer ID are not retrieved by the retrieval process (S12), the recording system 12 determines that the corresponding recorder has not performed at least two OPC operations and thus a new OPC operation is performed (S13). After the new OPC operation is performed, a recording power value obtained by the new OPC operation is additionally recorded along with a unique drive manufacturer ID of the recorder performing the new OPC operation in the Field 1 of the RMD 1 (S13).

On the other hand, if the recording power values recorded in relation to the same drive manufacturer ID are retrieved by the retrieval process at step S12, the recording system 12 calculates a difference value between the recording power values (S14). A comparison operation is performed so that a determination can be made as to whether the difference value is greater than a preset reference value (S15). The reference value can be an arbitrary value set according to a result of one or more tests performed in the process of developing or manufacturing the recorder. The reference value can be set within an allowable error range necessary to determine whether the system of the recorder is stabilized.

Figure 1:
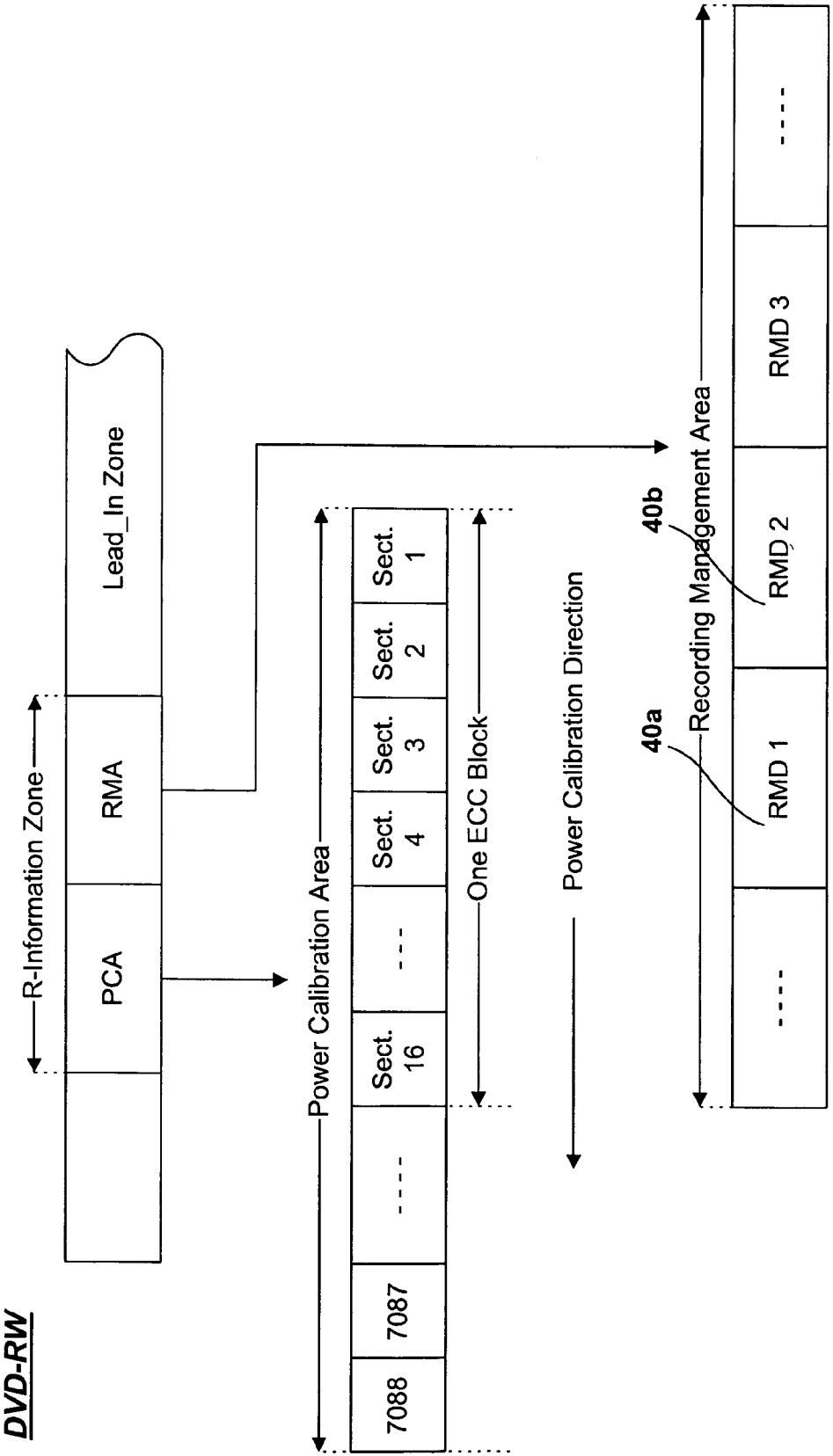
FIG. 1 is a schematic diagram illustrating a power calibration area (PCA) and a recording management area (RMA) assigned to a rewritable optical disc according to a related art.
Figure 4:
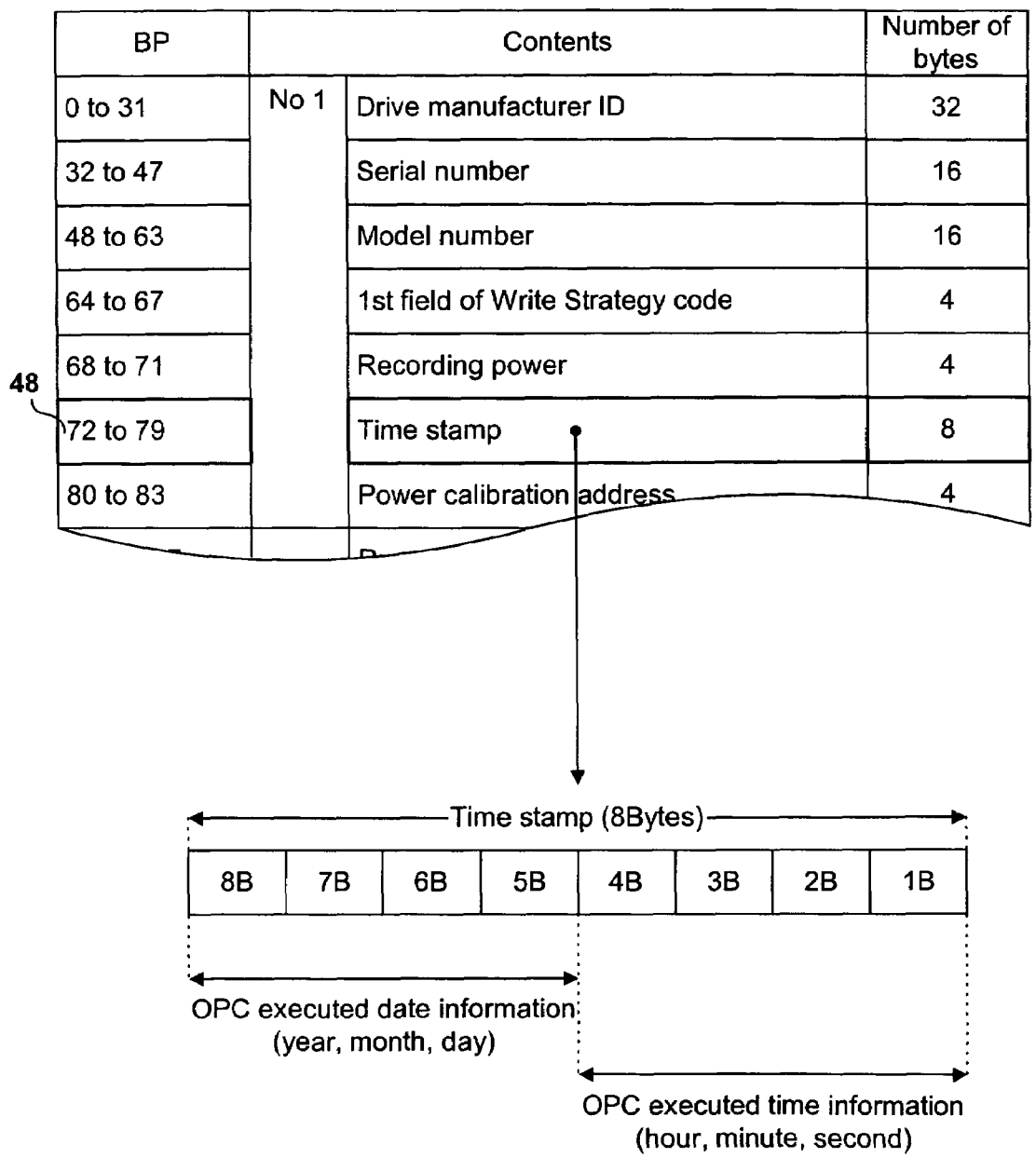
FIG. 4 is a table illustrating information recorded in a time stamp in the OPC related information recorded in the second field (Field 1) of the RMD 1 of FIG. 3.

If the difference value between the recording power values is not greater than the reference value (S15), the recording system 12 determines that the recorder system has been stabilized, and selects and uses a recording power value recorded according to a result of the last OPC operation, among the recorded recording power values associated with LGE_drive. This can be accomplished by examining the time stamps. For example, the recording system 12 refers to the time stamps of LGE_drive described with reference to FIG. 4 to determine which one of the recorded recording power values (associated with the current drive) is from the last OPC operation. Then the recording system 12 selects and uses the recording power value obtained based upon the last OPC operation (S16).

If the difference value between the recording power values is greater than the reference value (S15), the recording system 12 calculates a mean (average) value between the recording power values and uses the calculated mean value to perform a data recording operation (S17). In the alternative, a new OPC operation can be executed to obtain the new OPC information including a new recording power value. Such new OPC information can be recorded in the Field 1 of the RMD 1 adjacent to the previously recorded OPC information.

A data recording operation is performed (S18) using the recording power value obtained based upon the new OPC operation (S13), the recording power value obtained based upon the last OPC operation (S16), or the mean value between the recording power values (S17). As a result, the OPC operations are efficiently and simply performed and a substantial data recording operation is rapidly performed in a state in which the system of the recorder is stabilized.

In accordance with a second embodiment of the present invention, at least two recording power values and a plurality of beta ratio values indicating asymmetric ratios of radio frequency (RF) signals detected according to OPC operations executed are recorded in a specific area of the DVD-RW as resultant information items obtained from the executed OPC operations.

For example, as in the first embodiment, the first of the two recording power values associated with the current drive (LGE_drive) is recorded in the second field (Field 1) of the RMD 1 as shown in FIG. 8 as the first recording power information (Recording power (1)) at $69^{th}$ to $72^{nd}$ bytes (BP 68 to 71) having a size of 4 bytes. On the other hand, the second of the two recording power values is recorded as the second recording power information (Recording power (2)) at $197^{th}$ to $200^{th}$ bytes (BP 196 to 199) in the second field (Field 1) of the RMD 1.

In addition, as shown in FIG. 8, the two beta ratio values obtained from the two executed OPC operations for LGE_drive are recorded in the Field 1 of the RMD 1. The first beta ratio value is recorded and managed as first beta ratio information (Beta Ratio (1)) in a reserved area (previously indicated by "Set to (00)" in FIG. 6) at $115^{th}$ and $116^{th}$ bytes (BP 114 and 115) having a size of 2 bytes in the second field (Field 1) of the RMD 1. Subsequently, the second beta ratio value is recorded as second beta ratio information (Beta Ratio (2)) in a reserved area at $243^{rd}$ and $244^{th}$ bytes (BP 242 and 243) having a size of 2 bytes in the second field (Field 1) of the RMD 1. These recording power information items and the beta ratio information items are recorded in relation to the same drive manufacturer ID (i.e., LGE_drive).

Upon receiving a recording command through an interface with the microcomputer 13, the recording system 12 compares the plurality of recording power values recorded in relation to the same drive manufacturer ID within the rewritable RMD block and efficiently and simply performs an OPC operation and/or data recording operation according to a result of the comparison. This will be described below in detail.

Figure 9:
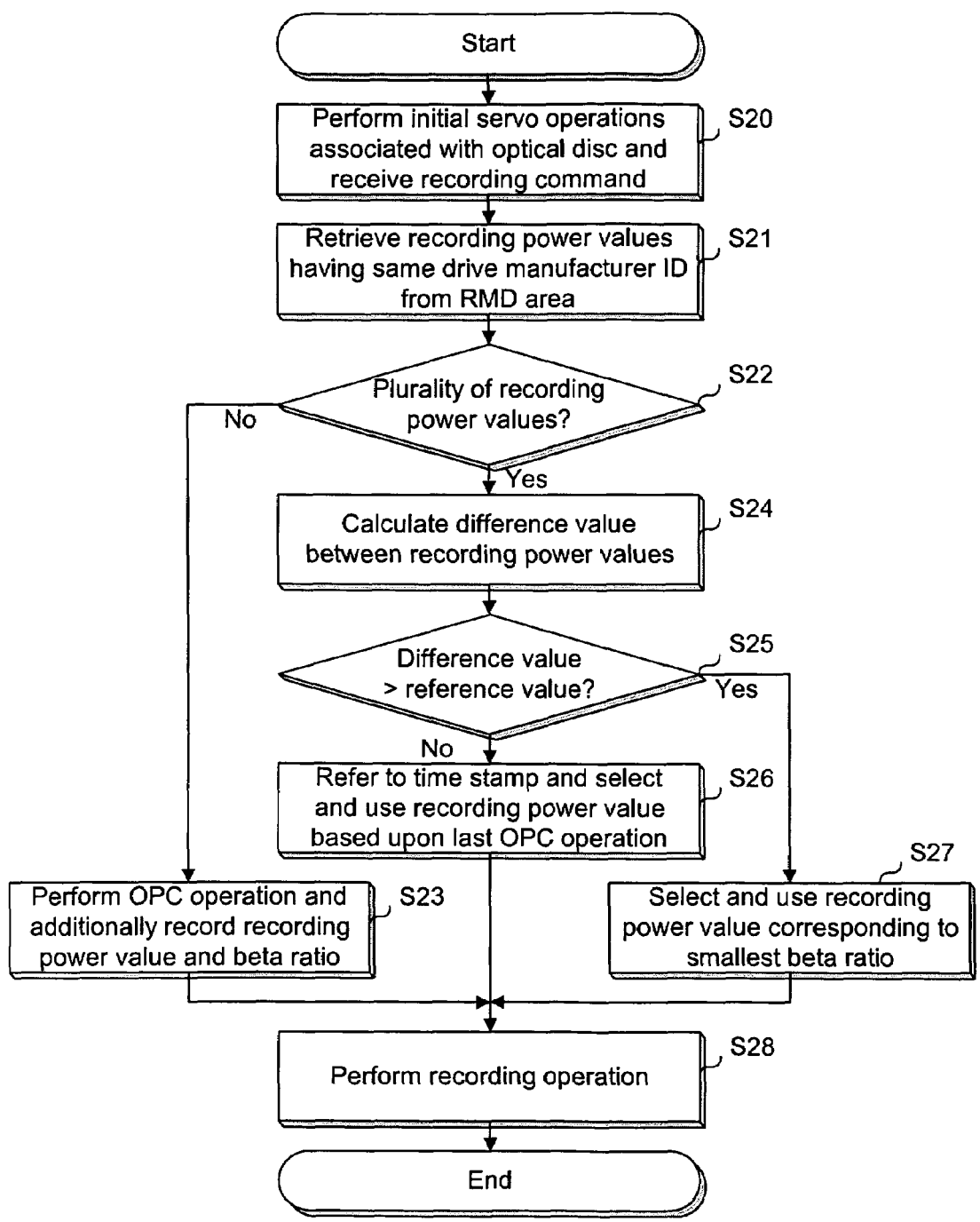
FIG. 9 is a flow chart illustrating an OPC method in the recorder in accordance with a second embodiment of the present invention.

FIG. 9 is a flow chart illustrating an OPC method in the recorder in accordance with the second embodiment of the present invention. FIG. 9 is identical to FIG. 7, except that at steps S17 and S27, the use of the mean value is replaced with the use of the smallest beta ratios and that the beta ratios are recorded in the Field 1 (of an RMD such as RMD 1). Referring to FIGS. 8 and 9, where the DVD-RW 10 is inserted into the recorder such as the DVD-recorder as an example, the microcomputer 13 performs a set of initial servo operations such as conventional focus and tracking servo operations. When a recording command is received according to a user request (S20), the microcomputer 13 controls an operation of the recording system 12.

As described with reference to FIG. 8, the recording system 12 retrieves recording power values recorded in relation to the same drive manufacturer ID (e.g., LGE_drive) from a specific area of the DVD-RW 10, for example, the second field (Field 1) of the RMD 1 (S21).

If the recording power values recorded in relation to the same drive manufacturer ID are not retrieved by the retrieval process (S22), the recording system 12 determines that the corresponding recorder has not performed at least two OPC operations and thus, a new OPC operation is performed (S23). After the new OPC operation is performed, a recording power value and a beta ratio value obtained based upon the new OPC operation are additionally recorded along with a unique drive manufacturer ID of the recorder performing the new OPC operation (S23) in the Field 1 (of the RMD) adjacent to any previously recorded OPC values associated with the same drive.

On the other hand, if the recording power values recorded in relation to the same drive manufacturer ID are retrieved by the retrieval process, the recording system 12 calculates a difference value between the recording power values (S24). A comparison operation is performed so that a determination can be made as to whether the difference value is greater than a preset reference value (S25). The reference value can be an arbitrary value set according to a result of one or more tests performed in the process of developing or manufacturing the recorder. The reference value can be set within an allowable error range necessary to determine whether the system of the recorder is stabilized.

If the difference value between the recording power values is not greater than the reference value (S25), the recording system 12 determines that the recorder system has been stabilized, and selects and uses the recording power value recorded according to the result of the last OPC operation, among the recorded recording power values. For example, the recording system 12 refers to the time stamps described with reference to FIG. 4 to determine which one of the OPC information recorded in the Field 1 is associated with the last OPC operation, and selects and uses the recorded recording power value obtained based upon the last OPC operation (S26).

On the other hand, if the difference value between the recording power values is greater than the reference value as a result of the comparison (S25), the recording system 12 retrieves beta ratio values recorded in relation to these recording power values. Then the recording power value recorded in relation to the smallest of the recorded beta ratio values, for example, a beta ratio value close to zero, is selected and used (S27).

A data recording operation is performed (S28) using the recording power value obtained based upon the new OPC operation, the recorded recording power value obtained based upon the last OPC operation, or the recorded recording power value linked to the smallest beta ratio value among the recorded beta ratio values associated with LGE_drive. As a result, the OPC operation is efficiently and simply performed and a substantial data recording operation is rapidly performed in a state in which the system of the recorder is stabilized.

Figure 10:
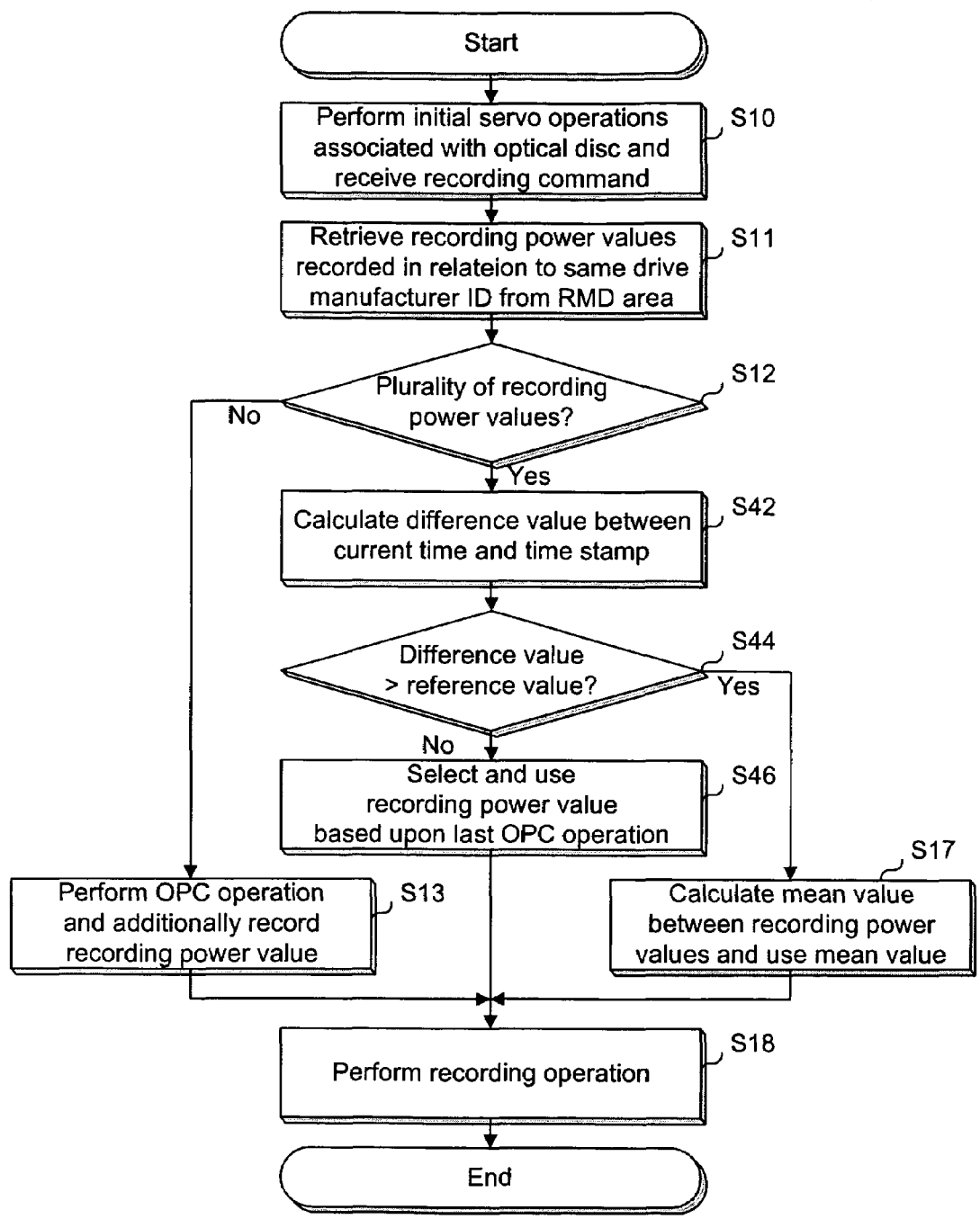
FIG. 10 is a flow chart illustrating an OPC method in the recorder in accordance with a third embodiment of the present invention.

FIG. 10 is a flow chart illustrating an OPC method according to a third embodiment of the present invention. FIG. 10 is identical to FIG. 7, except that steps S14-S16 of FIG. 7 are respectively replaced with steps S42, S44 and S46 in FIG. 10. Thus, only steps S42, S44 and S46 and any other modifications are now discussed.

Referring to FIG. 10, if the recording values recorded in relation to the same drive manufacturer ID are retrieved at step S12, the recording system 12 calculates at step S42 a difference between the current time and the recorded time stamp from the Field 1 of the RMD 1. This difference calculation can be made as follows. Each of the recorded time stamps associated with the same drive is compared with the current time to find the time stamp of the last executed OPC operation and to obtain the difference between this time stamp and the current time. In the alternative, the recorded time stamps associated with the same drive can be compared to each other to find the time stamp of the last executed OPC operation, which is then compared with the current time. At step S44, if the time difference is greater than a reference value, then step S17 (using the mean of the recorded recording power values) or a new OPC is performed. If the time difference at step S44 is not greater than the reference, then the recorded recording power value obtained from the last OPC operation is used at step S46.

In the present invention, if more than two recording power values are recorded for one same drive in the RMD, the latest two recording power values may be used, e.g., at step S14 in FIG. 7, or some other criteria may be set.

As apparent from the above description, the present invention provides a method for performing optimal recording power calibration (OPC) in a recorder and a recording medium therefor, which can avoid an unnecessary OPC operation when a recording command is received in a state in which a recorder system is stabilized normally and can prevent or reduce a delay in carrying out the data recording operation.

Although the preferred embodiments of the present invention have been disclosed for illustrative purposes, those skilled in the art will appreciate that various modifications, additions and substitutions are possible, without departing from the scope of the invention.

What is claimed is:

1. A method of controlling a recording operation of a recording medium, comprising:
   in response to a recording request from a user, determining whether power levels associated with at least two previous optimum power calibration (OPC) operations associated with a common drive are recorded on the recording medium;
   if power levels associated with at least two previous optimum power calibration (OPC) operations are recorded on the recording medium, calculating a difference between power levels associated with the at least two previous optimum power calibration (OPC) operations to generate a difference value;
   if the difference value is less than a predetermined reference value, recording information on the recording medium with a power level of a latest of the at least two previous optimum power calibration (OPC) operations; and
   if the difference value is greater than the predetermined reference value, calculating a mean power value of the at least two previous optimum power calibration (OPC) operations and recording the information on the recording medium with the calculated mean power level.

2. The method of claim 1, further comprising:
   if power levels associated with at least two previous optimum power calibration (OPC) operations are not recorded on the recording medium, performing a new optimum power calibration (OPC) operation;
   recording on the recording medium a new power level corresponding to the new optimum power calibration (OPC) operation; and
   recording the information on the recording medium with the new power level.

3. A method of controlling a recording operation of a recording medium, comprising:
   in response to a recording request from a user, determining whether power levels associated with at least two previous optimum power calibration (OPC) operations associated with a common drive are recorded on the recording medium;
   if power levels associated with at least two previous optimum power calibration (OPC) operations are recorded on the recording medium, calculating a difference between power levels associated with the at least two previous optimum power calibration (OPC) operations to generate a difference value;
   if the difference value is less than a predetermined reference value, recording information on the recording medium with a power level corresponding to a smallest beta value of the at least two previous optimum power calibration (OPC) operations; and
   if the difference value is greater than the predetermined reference value, calculating a mean power value of the at least two previous optimum power calibration (OPC) operations and recording the information on the recording medium with the calculated mean power level.

4. The method of claim 3, further comprising:
   if power levels associated with at least two previous optimum power calibration (OPC) operations are not recorded on the recording medium, performing a new optimum power calibration (OPC) operation;
   recording on the recording medium a new power level corresponding to the new optimum power calibration (OPC) operation; and
   recording the information on the recording medium with the new power level.

* * * * *